(12) United States Patent
Nielson et al.

(10) Patent No.: US 7,307,117 B2
(45) Date of Patent: *Dec. 11, 2007

(54) HIGH STRENGTH REACTIVE MATERIALS AND METHODS OF MAKING

(75) Inventors: Daniel B. Nielson, Tremonton, UT (US); Richard L. Tanner, Brigham City, UT (US); Gary K. Lund, Malad, IN (US)

(73) Assignee: Alliant Techsystems Inc., Edina, MN (US)

(*) Notice: Subject to any disclaimer, the term of this patent is extended or adjusted under 35 U.S.C. 154(b) by 483 days.

This patent is subject to a terminal disclaimer.

(21) Appl. No.: 10/462,437

(22) Filed: Jun. 16, 2003

(65) Prior Publication Data

US 2004/0116576 A1    Jun. 17, 2004

Related U.S. Application Data

(63) Continuation of application No. 09/789,479, filed on Feb. 21, 2001, now Pat. No. 6,593,410.

(60) Provisional application No. 60/184,316, filed on Feb. 23, 2000.

(51) Int. Cl.
    *C08K 3/08*    (2006.01)
(52) U.S. Cl. .................... 524/439; 524/440; 524/441
(58) Field of Classification Search ......... 524/439–441
    See application file for complete search history.

(56) References Cited

U.S. PATENT DOCUMENTS

| 2,961,712 A | 11/1960 | Davis |
| 3,980,612 A | 9/1976 | Gangal |
| 4,153,661 A | 5/1979 | Ree et al. |
| 4,368,296 A | 1/1983 | Kuhls et al. |
| 4,665,113 A | 5/1987 | Eberl |
| 4,985,190 A | 1/1991 | Ishikawa et al. |
| 5,763,519 A | 6/1998 | Springsteen |
| 6,427,599 B1 | 8/2002 | Posson et al. |
| 6,593,410 B2 * | 7/2003 | Nielson et al. ............ 524/439 |
| 6,635,130 B2 | 10/2003 | Koch |
| 6,962,634 B2 * | 11/2005 | Nielson et al. ............ 149/19.3 |

* cited by examiner

*Primary Examiner*—Peter Szekely
(74) *Attorney, Agent, or Firm*—TraskBritt

(57) ABSTRACT

In this method for making a sintered reactive material, fuel particles are blended with a polymer matrix comprising at least one fluoropolymer in an inert organic media to disperse the fuel particles in the polymer matrix and form a reactive material. The reactive material is dried and pressed to obtain a shaped preform, which is sintered in an inert atmosphere to form the sintered reactive material. By sintering in an inert atmosphere, the sintered reactive material may include reactive metals and/or metalloids in a nonoxidized state. The resulting sintered reactive material preferably has a tensile strength in excess of 1800 psi and an elongation at break in excess of 30%.

41 Claims, 4 Drawing Sheets

HIGH STRENGTH REACTIVE MATERIALS AND METHODS OF MAKING

CROSS-REFERENCE TO RELATED APPLICATIONS

This application is a continuation of application Ser. No. 09/789,479, filed Feb. 21, 2001, now U.S. Pat. No. 6,593,410, issued Jul. 15, 2003, which application claims the benefit of provisional application 60/184,316 filed on Feb. 23, 2000, the complete disclosure of which is incorporated herein by reference.

GOVERNMENT LICENSING RIGHTS

The U.S. Government has a paid-up license in this invention and the right in limited circumstances to require the patent owner to license others on reasonable terms as provided for by the terms of NCRADA-NSWCDD-00-035 awarded by the Naval Surface Warfare Center.

BACKGROUND OF THE INVENTION

1. Field of the Invention

The present invention pertains to high strength reactive materials and methods for their production, especially high strength materials having maximum stresses and strains that exceed those heretofore obtained with conventionally fabricated energetic materials. The present invention also relates to warheads comprising the high strength energetic materials.

2. Description of the Related Art

Various military warheads are equipped with a liner or inner sheath comprised of a reactive material. In principle, upon impact these warheads are intended to deliver kinetic energy and chemical energy from the reactive material. The reactive material is intended to fragment, react and release energy (chemical) as a result of the high temperature and pressure (shear) when the warhead impacts its target. The reactive fragments provide additional means for threat destruction.

At present, however, there has been a need for a sufficiently robust reactive material that is inert during storage, but which has significantly improved strength characteristics. Reactive materials produced by conventional methods have been found to possess inadequate tensile strength and to be characterized by poor elongation at break.

It would be a significant advancement in the art to discover a reactive material comprised of a fluoropolymer and a particulate metal or metalloid which has a tensile strength greater than 1800 psi and a strain (elongation at break) of greater than 30%, and a method for its production.

Metallic particles such as aluminum, zirconium, titanium, and magnesium are energetic fuels that, if distributed in a fluoropolymer, would establish an excellent reactive material. However, known methods of distributing metal particles into fluoropolymers involve the oxidization of these particles, which significantly reduces their energetic capacities. For example, U.S. Pat. No. 2,961,712 to Davis discloses a method of making filled polytetrafluoroethylene products in which a metallic filler, such as aluminum powder, is inter-dispersed and precipitated in a dispersion of the polytetrafluoroethylene, which is then dried and sintered. The sintered mixture is broken up into powder. The sintered powder is then mixed with another polytetrafluoroethylene dispersion, precipitated, and subjected to a second sintering process. Davis characterizes its fillers as substantially inert, most probably due to the use of an oxidizing atmosphere during preparation and sintering of its energetic particles. Other U.S. patents disclose the use of water or aqueous solutions for dispersing metal and metalloid particles in a fluoropolymer. However, water generally functions as an oxidizing agent and, in the presence of some metals, such as aluminum, can cause the release of hazardous amounts of hydrogen gas.

BRIEF SUMMARY OF THE INVENTION

The present invention provides a method of making a sintered reactive material comprising nonoxidized reactive fuel particles present in a sintered fluoropolymer matrix.

The present invention also provides a sintered reactive material comprising nonoxidized reactive fuel particles in a sintered fluoropolymer matrix.

In accordance with the present invention as embodied and broadly described herein, a method is provided for making a sintered reactive material. The method comprises blending fuel particles and a polymer matrix comprising at least one fluoropolymer in an inert organic media to disperse the fuel particles in the polymer matrix and form a reactive material. Nonoxidized reactive metals and/or metalloids may be selected as the fuel particles. The reactive material is dried and pressed to obtain a shaped preform, which is sintered in an inert atmosphere to form the sintered reactive material. By sintering in an inert atmosphere, oxidation of the fuel particles is avoided.

In accordance with another aspect of this invention, there is provided a sintered reactive material comprising a matrix of one or more fluoropolymers and at least one nonoxidized metal or metalloid in fine particulate form dispersed in the matrix. The sintered reactive material has a tensile strength in excess of 1800 psi and an elongation at break in excess of 30%. It has been found that the sintered reactive material may exhibit tensile strengths in excess of 2700 psi and an elongation at break in excess of 100%.

The present invention also includes process embodiments which now enable the fabrication of reactive material having the sought-after physical properties. The reactive materials may be shaped to form liners or inserts for warheads on various hardware, such as air-to-air, ground-to-air, or air-to-ground advanced tactical missiles. A warhead with such a liner and the missile carrying it is part of the invention.

The reactive materials may also be shaped in spheres or other selected form to generate reactive "grape" shot. When a warhead impacts or an explosive is set off, the reactive material may be fragged but is nonetheless dispersed following impact or in the explosion. The preshaped reactive material can thus form a noncontinuous liner for a warhead.

The present invention also contemplates a method of protecting aircraft, ships vehicles, missiles or the like against threats; this method comprises deploying tactical munitions or tactical missiles with the reactive material as a warhead liner or reactive material as "grapeshot" against the threat.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention. In such drawings.

DETAILED DESCRIPTION OF PREFERRED EMBODIMENTS AND METHODS OF THE INVENTION

Figure 1:
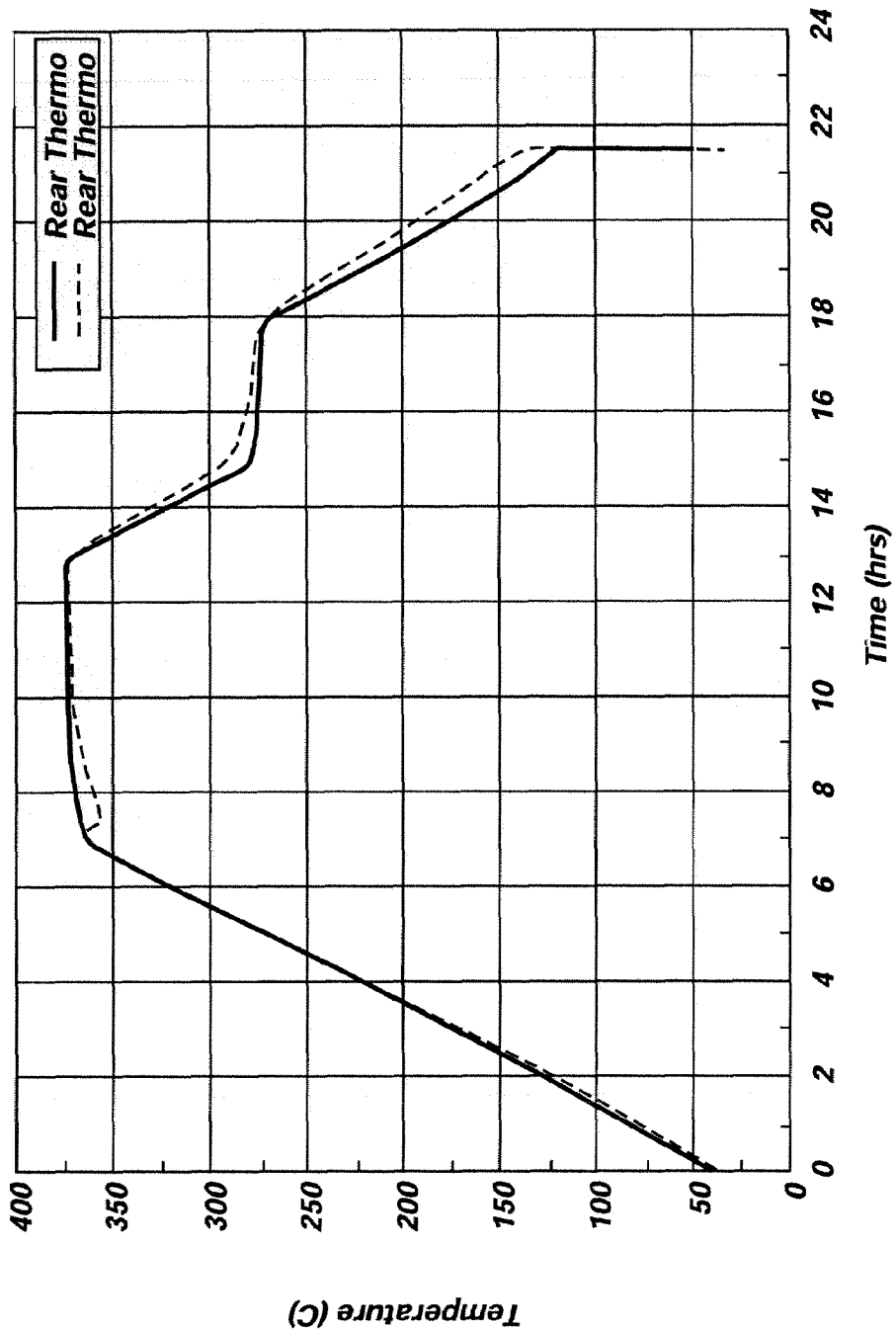
FIG. 1 is a representative plot of a sintering cycle.

Reference will now be made in detail to the presently preferred embodiments and methods of the invention as described below. It should be noted, however, that the invention in its broader aspects is not limited to the specific details, representative devices and methods, and examples described in this section in connection with the preferred embodiments and methods. The invention according to its various aspects is particularly pointed out and distinctly claimed in the attached claims read in view of this specification, including appropriate equivalents.

The reactive material of the present invention is characterized as having a high tensile strength and a high maximum strain. As used herein, a high tensile strength means greater than about 1800 psi and a high strain means greater than about 30% elongation at break.

Compositionally, the matrix phase is comprised of at least one fluoropolymer. Suitable fluoropolymers include thermoplastic and vulcanizable polymers, copolymers and terpolymers. The fluoropolymers include fluorothermoplastics and fluoroelastomers (including so-called fluororubbers) such as polytetrafluoroethylene, tetrafluoroethylene/hexafluoropropylene/vinylidene fluoride terpolymers, and vinylidene fluoride and hexafluoropropylene dipolymers (copolymers) among others. These and other suitable matrix fluoropolymers are available from Dyneon LLC of Oakdale, Minn. (Dyneon™ Fluorothermoplastic THV x 240A and THV x 246; Fluorel™ Fluoroelastomer FC 2174 (a curable copolymer of vinylidene fluoride and hexafluoro propylene), and Dyneon™ THV Fluorothermoplastic 200P (terpolymer of TFE/VDF/HFP); DuPont (7 series fluoropolymer resins of which resins 7A and 7C are illustrative)). Other fluoropolymer resins available from DuPont include Teflon® NXT75 fluoropolymer resin (modified PTFE granular molding resin) and Viton® brand fluoroelastomers such as Viton® B and Viton® E-60C. Exemplary, vulcanizable (curable) extrudable fluoropolymers are available from Zeus Int'l (Orangeburg, S.C.) and these include the "FEP" resin.

A fine particulate fuel is dispersed in the matrix. The fuel may be comprised of one or more metals or metalloids. Metals are preferred and include, by way of example, aluminum, zirconium, titanium, magnesium and a combination of any thereof.

The fuel, by present preference, has an average particle size greater than 1 $\mu$m to reduce the sensitivity (ESD, impact and friction) of the reactive material. In principle, larger sized particles up to less than 500 $\mu$m in average particle size may be used. A practical maximum size will be dictated by the rate of reaction and rate at which sufficiently sized fragments form upon impact. A presently more preferred upper value is about 250 $\mu$m. Satisfactory results have also been achieved with powdered fuels, such as powdered aluminum, having particle sizes in the range of approximately 1 $\mu$m to 10 $\mu$m, such as 5 $\mu$m and 3 $\mu$m.

The relative amounts of the two primary constituents of the present reactive material can vary within relatively broad ranges. The fuel must be present in an amount greater than 0% and up to approximately 35% by weight of the reactive material. In general, the fuel comprises approximately 15-35% by weight of the reactive material, and a present preference is for approximately 25 to 30% by weight. The matrix comprises the remainder of the two primary constituents.

The present reactive material may include various additives singly or in combination. Fibers, bonding agents and, depending on the fluoropolymer, cross-linking agents, among others, may be included in the reactive material. Suitable fibers include graphite fibers and aramid fibers.

The present sintered reactive material is at least shaped (consolidated) in an environment that at least essentially excludes oxygen. A selected powdered fuel and a selected fluoropolymer(s) are physically blended in an inert solvent organic media (if necessary). The blend may, if desired, be washed with an inert organic media. The blend is then dried at a selected temperature, and the solids blend is shaped under a selected high pressure while under a hard or sufficient vacuum to form an object (pellets, disk, wafer, cone, etc.) whereby air voids are at least minimized and the density is maximized.

Preparing the blend, i.e., compounding, can be conducted using high or low shear mixing mixers, of which a Banbury mixer, Haake Rheocord mixer or twin screw extruder is typical. Other mixers such as a Hobart mixer or a Muller mixer may, in principle, be used. The Hobart mixer with a high-shear whip attachment is a mixer of present choice. The Haake Rheocord mixer and the twin screw extruders are also presently preferred. A solvent, such as heptane or ethanol, may be used during blending to facilitate homogeneous mixing. Generally, the amount of solvent used will depend upon the particular mixer selected and can be determined by those skilled in the art. However, it has been found that solvent levels of 45 weight percent in Hobart mixers produce advantageous results.

A screening stage may be introduced at this time in order to break up agglomerates and produce higher homogeneity in the pressing stage. Screening preferably involves the use of a 4-mesh screen, although other screen sizes may be used in the scope of this invention. Screening also preferably comprises pressing agglomerates through the screen, such as by hand.

The shaping stage can be a single pressing stage, or multistaged, but under vacuum. A single pressing stage follows an optional preheat of the reactive material. A single stage shaping involves placing the selected amount of the solid blend (reactive material) in a die (may be a heated die), applying the selected pressure to the reactive material at the suitable temperature for a sufficient time to obtain a shaped preform, and then recovering the preform. The typical actual pressures can be from approximately 3000 psi to 10000 psi, more particularly from 4000 psi to 8000 psi. The pressure may be applied for about 5 seconds to a few minutes (5 minutes), preferably 30 seconds to 90 seconds, and more particularly for about 30 seconds to 60 seconds.

The shaping may also be conducted in stages to minimize induced stress and strain in the shaped object. For smaller-sized, shaped objects, such as thin disks or wafers, shaping can be conducted using a die (such as a vacuum heated die) and a press, but under vacuum. The blend of the solid selected reactive material may, if desired, be first warmed to the approximate temperature of the heated die. Pressure is initially applied at an actual pressure from 3000 psi to 10000 psi, typically 4000 to 8000 psi. The pressing is conducted for a sufficient time, typically from 5 seconds to a few minutes (e.g., about 5 seconds to about 5 minutes, more preferably 1 to 2 minutes), but the actual time will be based on the size of the object to be shaped. The pressure is next released and the object being shaped relaxes, still under vacuum, for a selected period of time which, for smaller objects, can be on the order of about 30 seconds to about 1 minute. Pressure is then reapplied again under vacuum, and the object being shaped is pressurized for 30 seconds to a few minutes. The pressure is then released and the preform (object) is recovered. The multistaged shaping process may involve, for example, inverting of the sample between pressing stages so as to decrease gradients inside the sample.

The total dwell time in the shaping is preselected but may be on the order of a few seconds to a few minutes at 4000 psi for a thin disk of reactive material being fabricated from powdered aluminum (26.5%) and PTFE (DuPont 7C resin, remainder).

As mentioned above, the reactive material to be shaped (consolidated) in either a single or multistage process may be heated to a temperature approximating that of the heated die in a pressing apparatus. The reactive material may, in general, be subjected to an initial thermal treatment in an approximate range of 170° F. (76.6° C.) to about 190° F. (87.7° C.) before (consolidating) shaping.

Figure 2:
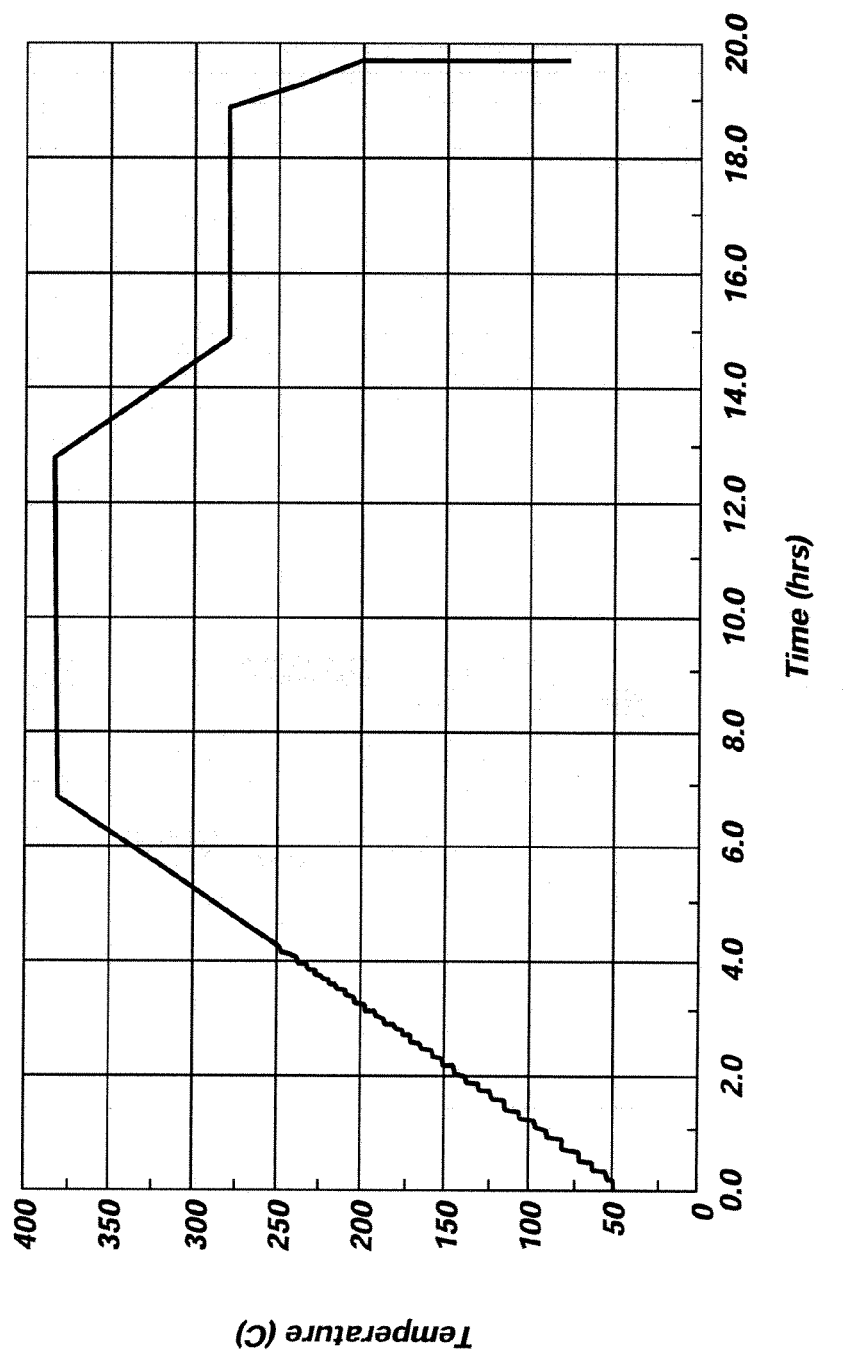
FIG. 2 is a representative plot of another sintering cycle for 1 inch (2.54 cm) diameter spheres of shaped reactive material.

The objects obtained are then sintered. The sintering may proceed such as by adapting the time vs. temperature plot in FIG. 1 or FIG. 2. The proper sinter cycle is, in general, essential to obtaining the desired physical properties and to avoid creating cracks. Shaping (consolidating) under vacuum and following a specified sintering cycle are important to obtaining a product with the desired physical properties.

In the sintering process, the preform, e.g., shaped object, is transformed into a sintered object having the desired increased tensile strength and decreased void fraction. The sintering generally involves a first stage in which the preform expands as its temperature rises above the melting point of the fluoropolymer. In the second phase, the particles in the preform coalesce and eliminate voids with the particles fusing together.

Sintering may slightly distort the preform shape. Thus, the sintered object may, if desired, be machined, such as by milling, to a final configuration or another shape after sintering.

Figure 3A:
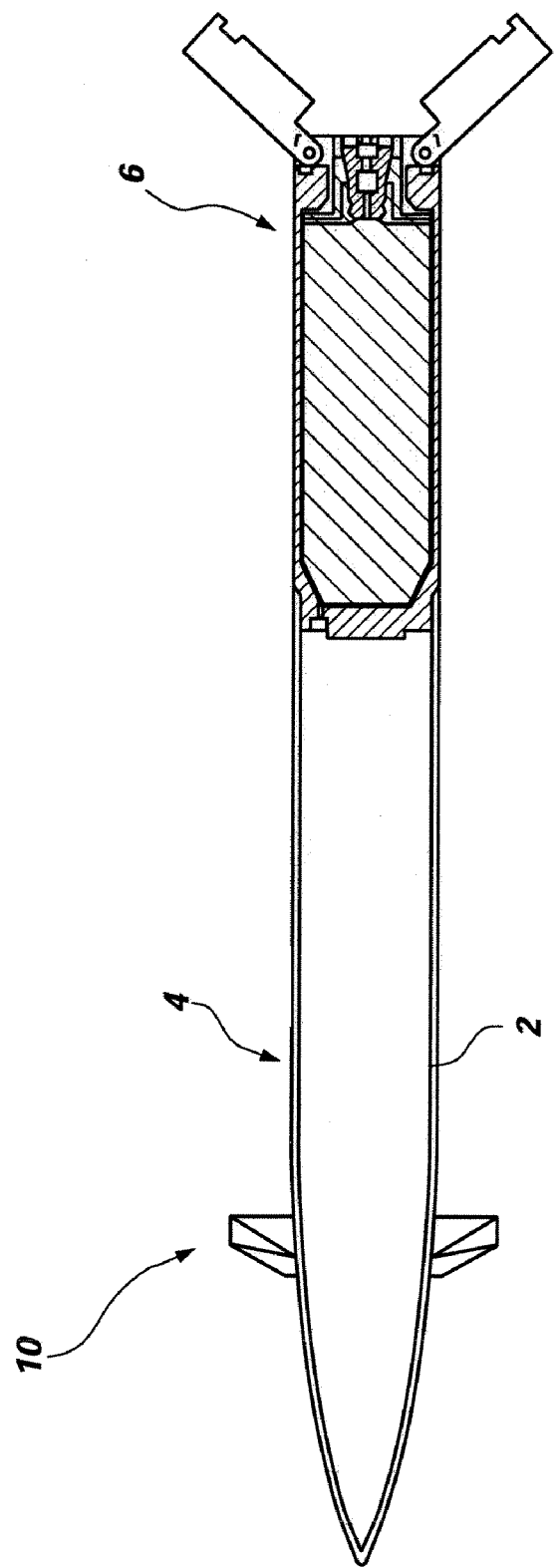
FIGS. 3A and 3B are schematic drawings of a warhead having the reactive material of the present invention.
Figure 3B:
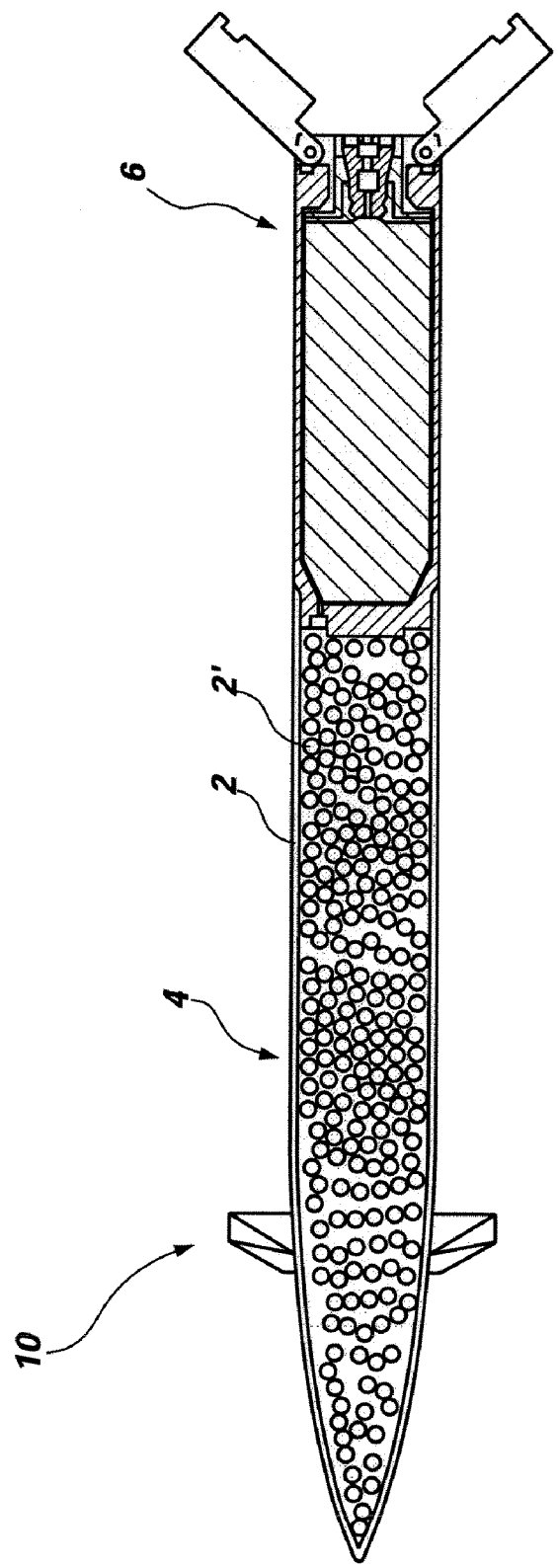

The reactive material of the present invention may be shaped to form a liner 2 for a warhead 4, as shown in FIG. 3A. The liner 2 may be continuous and formed on an inner surface of the warhead 4. A rocket motor 6 may be used with the warhead 4 to form projectile 10. The warhead 4 may also include a noncontinuous liner 2', as shown in FIG. 3B. The reactive material used in the noncontinuous liner 2' may be shaped into spheres or other shapes to form reactive "grape" shot.

In general, the fluoropolymer resins exhibit poor thermal conductivity and, therefore, the preform of reactive material is heated to the sintering temperature at a rate sufficient to avoid cracking or the like. For instance, with thick preforms there will be a temperature gradient within the preform during the warm-up, and raising the temperature too rapidly can result in cracks. It is, therefore, important to avoid excessive thermal gradient in the sintering oven (furnace) and in the preform. The warm-up can be staged so that an initial heat-up rate is applied until a selected temperature is reached (typically below the melting point) and then the heat-up rate is slowed down until the sinter temperature is reached. Other staging may, if desired, be used such as differing heat-up rates separated by a hold or dwell time at an intervening target temperature as the preform is heated up through the melting point to the sintering temperature. The sintering temperature is typically in a range of 350-385° C. and the dwell time is selected to avoid thermal degradation. The dwell time may depend on the thickness of the sintered part. Generally, dwell time may last up to about 6 hours or more, depending upon the thickness of the part. A lower sintering temperature in this range may be used for large objects such as billets or blocks.

After soaking at the sintering temperature, the molten mass of the object is cooled to ambient conditions. As the molten mass cools through the melting point, the fluoropolymer chains may array themselves in more ordered alignment. The degree of alignment (crystallinity) is presently thought to be a function of the cooling rate. The cooling rate is sufficiently slow to avoid cracking due to thermal gradients. For a virgin fluoropolymer, a cooling rate in a range of 80° C./hour to 15° C./hour, more preferably 45° C./hour to 25° C./hour, be considered. The cooling rate for the sintered reactive material is determined based on its thickness. Slow cooling is preferably conducted so that at least the midsection of the sintered reactive material is below the melting point of the fluoropolymer and the center has crystallized. This can initially be determined using a test sample provided with thermocouples to "benchmark" the cooling rate and temperatures to a rate sufficient to avoid cracking or the like for the object to be sintered.

For larger-sized sintered objects, an annealing stage may be included in the cooling period.

The exclusion of air (oxygen) may, if necessary, be extended to the sintering cycle. This may be desired with thicker preforms to be sintered and is less important for thinner objects such as discs or wafers. This may be accomplished by conducting the sintering under an inert atmosphere (a Noble gas such as argon) and/or sealing the object within a bag to limit the product being exposed to air (oxygen) during the sintering. For example, an inert atmosphere sintering of aluminum/polytetrafluoro-ethylene preforms may be accomplished in a gas-tight, high temperature oven using gases such as nitrogen, helium, neon and argon. The inert gas may be fed into the oven through an inert gas inlet valve. The inlet valve is pressure regulated to maintain a positive pressure inside the oven. The original air in the oven may be displaced by the inert gas using a positive pressure purge or a vacuum pump. A circulating air oven is preferred to produce uniform samples by minimizing temperature gradients inside the oven.

Various reactive material formulations are tabulated as follows:

| Reactive Material Formulations | | | |
|---|---|---|---|
| Ingredient | Mix 1 Baseline | Mix 2 | Mix 3 |
| PFTE 7C | 74.0 wt % | 74.0 wt % | 69.5 wt % |
| Valimet, Aluminum H-5 (5 μm) | 26.0 wt % | — | 29.5 wt % |
| Valimet, Aluminum H-3 (3 μm) | — | 26.0 wt % | — |

The baseline material from Mix 1 was pressed under vacuum and sintered generally as in Example 1. The recovered sintered product had a tensile strength of 2200 psi and an elongation at break of 315%.

Mix 2 was prepared and treated under a nonoxidizing atmosphere during sintering. The sintering cycle was analogous to that in FIG. 1. The bottom, middle and top of the sintered product (2"×2" disk) were tested and the tensile strengths were in a range of 1990 psi to 2090 psi and the percent of elongation at break was respectively 327%, 238% and 286%.

| Mechanical Properties of Reactive Materials | | |
|---|---|---|
| Mix Number | Tensile Strength (psi) | Elongation (%) |
| Mix 1<br>2.0 inch diameter disc<br>0.10 inch thick | 2200 | 315 |
| Mix 4<br>2.0 inch diameter disc<br>2.0 inch thick | 2320 bottom<br>1900 middle<br>2230 top | 328 bottom<br>276 middle<br>313 top |
| Mix 15<br>2.0 inch diameter<br>2.0 inch thick puck | 2920 bottom<br>2960 middle<br>1960 top | 333 bottom<br>307 middle<br>310 top |
| Mix 16<br>3.5 inch diameter<br>1.5 inch thick | 2000 end-1 oxidized<br>2010 end-2 oxidized<br>3180 middle<br>unoxidized | 310 end-1 oxidized<br>298 end-2 oxidized<br>370 middle<br>unoxidized |
| Mix 17<br>3.5 inch diameter<br>1.5 inch thick P37 | 3370 bottom *<br>3320 middle *<br>3420 top * | 290 bottom *<br>275 middle *<br>285 top * |

* Samples had course machining marks; inert sintered atmosphere

The utility of spheres of sintered reactive material was confirmed in high velocity gun tests. The tests evaluated the mechanical strength of the spheres using high speed photography viewed as the sphere impacted and passed through a metal sheet. The degree of breakup was used to confirm the effectiveness of the article.

The present invention is now described further with reference to the following nonlimiting examples.

EXAMPLE 1

A physical blend of powdered aluminum (Valimet, A1 H-5, 5μ average particle size) and fluoropolymer (PTFE, DuPont Teflon™ 7C resin) was prepared. Powdered aluminum (78.0 grams) was mixed with PTFE (222.0 grams) in heptane for 5 minutes in a propeller mixer. The solids blend was dried at 135° F. (57.2° C.) on a conductive tray for approximately 24 to 72 hours.

An amount of dried solids blend (130 grams) was pressed into a 2 inch (approximately 5.0 cm) pellet in a pellet press under vacuum at a pressure of approximately 8000 psi. The pressing cycle included pressing for about 1 minute under vacuum, releasing the pressure and allowing the pressed material to relax for about 30 seconds while still under vacuum, pressing again for about 1 minute under vacuum, releasing the pressure and allowing the pressed material to relax for about 30 seconds while still under vacuum, pressing for about another minute while under vacuum and releasing the pressure and recovering the pellet.

Two pellets were prepared using this procedure.

The die used in this pressing was heated to a temperature of about 170° F. (76.6° C.) to about 190° F. (87.7° C.).

While still warm from the pressing, the two pressed pellets were then inserted into a sintering oven (tube furnace) and the oven temperature was ramped up to 700° F. (371.1° C.) at a rate of about 36.4° F./minute for five minutes and 71.0° F./minute for the next five minutes. The actual temperature peaked at about 724° F. (384° C.). The pressed pellets were held at 700° F. (371.1° C.) for about 1 hour, the temperature was ramped down to 600° F. for about 30 minutes, the pellets were held at 600° F. (315.6° C.) for about 60 minutes, and the pellets were thereafter cooled to ambient temperature at an average cooling rate of 3.1° F. (1.7° C.)/minute.

Before sintering, the pellets were approximately 0.1 inch thick with a diameter of about 2 inches (5.0 cm).

EXAMPLE 2

A physical blend was prepared in a manner analogous to Example 1. The blend comprised powdered aluminum (Valimet, A1 H-5, 5μ; 24.5 wt. %), Fluorel™ 2174 (30.0 wt. %) and PTFE (DuPont Teflon™ 7C) (45.5 wt. %). The solids blend was made by initially combining acetone, the fluoropolymers (PTFE/Fluorenel™) and powdered aluminum, mixing in a propeller mixer for about 5 minutes, adding sufficient heptane to obtain a slurry, and drying the solids blend as in Example 1.

EXAMPLES 3-8

Blends are prepared in a manner analogous to Example 2. The compositions of these blends are as follows:

| | Example ** | | | | | |
|---|---|---|---|---|---|---|
| Ingredient | 3 | 4 | 5 | 6 | 7 | 8 |
| PTFE 7-C | | | | | 45.0 | 45.5 |
| THV-220 | | | | 76.0 | 30.0 | |
| Viton E60C | 77.4 | | | | | 30.0 |
| Fluorel 2174 | | 77.4 | | | | |
| Kel F 800 | | | 77.4 | | | |
| A1 H-5 | 22.6 | 22.6 | 22.6 | 24 | 25 | 24.5 |

** Amounts reported in weight percent

As in Example 2, a slurry is first prepared (acetone) and is washed with heptane or (hexanes).

Pellets are pressed from the blends. The pellets are about 2.0 inches in diameter and about 0.1 inch thick. The pellets are pressed and sintered as in Example 1 when using Teflon® or like fluoropolymer, whereas reactive materials using fluororubbers are molded/vulcanized at 250° C. for 18 hours.

EXAMPLE 9

A blend as in Example 1 was prepared but ethanol was used instead of heptane. The blend was prepared starting from 74 wt. % PTFE (1110 grams) and 26.0 wt. % powdered aluminum (A1 H-5, 5 μm, 390 grams).

A series of pressed pellets were prepared. The pellets were each approximately 2.0 inches in diameter.

The thickness was 0.1 inch (3 pellets), 0.50 inch (three pellets) 1.0 inch (three pellets), and 2.0 inches (three pellets). The pressing cycle was according to Example 1 with the press settings at 27000 pounds load for an approximate applied actual pressure of about 8000 psi to 13800 psi.

The pellets are relaxed at ambient pressure and temperature prior to sintering. For pellets of 2 inches thickness, a relaxation dwell time of about 2 to 3 hours is satisfactory. This relaxation or resting time between pressing and sintering permits the essentially complete, if not complete, removal of entrapped air and stress relaxation in the pellets.

The pellets are thereafter sintered. The pellets are placed in a sintering oven and the temperature increased at about 50° C./hour until a temperature of 380° C. is reached. The pellet samples are held at this temperature for about 6 hours.

The temperature of the sintering oven is then reduced at a rate of 50° C./hour until a temperature of 310° C. is reached. The pellets are soaked at this temperature for about 4 hours. The temperature is then lowered at a rate of about 50° C./hour to ambient temperature.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A method of making a sintered reactive material, comprising:
    blending fuel particles and a polymer matrix comprising at least one fluoropolymer in a medium that consists essentially of an inert organic medium to form a reactive material;
    drying the reactive material;
    pressing the reactive material to obtain a shaped preform; and
    sintering the shaped preform in an inert atmosphere to form a sintered reactive material.

2. The method of claim 1, wherein blending fuel particles and a polymer matrix comprises blending fuel particles comprising at least one member selected from the group consisting of aluminum, zirconium, titanium, and magnesium with the polymer matrix.

3. The method of claim 1, wherein blending fuel particles and a polymer matrix comprises blending fuel particles comprising at least one member selected from the group consisting of reactive nonoxidized metals and reactive nonoxidized metalloids with the polymer matrix.

4. The method of claim 1, wherein blending fuel particles and a polymer matrix comprises blending fuel particles having an average particle size of less than about 500 microns with the polymer matrix.

5. The method of claim 1, wherein blending fuel particles and a polymer matrix comprises providing the fuel particles in an amount sufficient to account for up to approximately 35 weight percent of a total weight of the sintered reactive material.

6. The method of claim 1, wherein blending fuel particles and a polymer matrix comprises providing the fuel particles in an amount sufficient to account for from approximately 15 weight percent to approximately 35 weight percent of a total weight of the sintered reactive material.

7. The method of claim 1, wherein blending fuel particles and a polymer matrix comprises providing the fuel particles in an amount sufficient to account for from approximately 25 weight percent to approximately 30 weight percent of a total weight of the sintered reactive material.

8. The method of claim 1, wherein blending fuel particles and a polymer matrix comprises blending fuel particles having an average particle size of not greater than about 250 microns with the polymer matrix.

9. The method of claim 1, wherein blending fuel particles and a polymer matrix comprises blending fuel particles having an average particle size in a range of from approximately 1 micron to approximately 10 microns with the polymer matrix.

10. The method of claim 1, wherein blending fuel particles and a polymer matrix comprises blending aluminum with the polymer matrix.

11. The method of claim 1, wherein pressing the reactive material to obtain a shaped preform comprises pressing the reactive material at a pressure ranging from approximately 3000 psi to approximately 10000 psi.

12. The method of claim 1, wherein sintering the shaped preform in an inert atmosphere comprises avoiding oxidization of the fuel particles.

13. The method of claim 1, wherein sintering the shaped preform in an inert atmosphere comprises heating the shaped preform in the inert atmosphere at a temperature that ranges from 350° C. to 385° C.

14. The method of claim 1, wherein sintering the shaped preform in an inert atmosphere to form the sintered reactive material comprises forming the sintered reactive material having a tensile strength greater than about 1800 psi and a strain greater than about 30% elongation at break.

15. The method of claim 1, wherein blending fuel particles and a polymer matrix comprising at least one fluoropolymer in a medium that consists essentially of an inert organic medium comprises blending the fuel particles and the polymer matrix in an environment that at least essentially excludes oxygen.

16. The method of claim 1, wherein drying the reactive material comprises drying the reactive material in an environment that at least essentially excludes oxygen.

17. The method of claim 1, wherein pressing the reactive material to obtain a shaped preform comprises pressing the reactive material in an environment that at least essentially excludes oxygen.

18. A method of making a sintered reactive material, comprising:
    blending fuel particles and a polymer matrix comprising at least one fluoropolymer in a medium that consists essentially of an inert organic medium to form a reactive material;
    drying the reactive material;
    pressing the reactive material to obtain a shaped preform; and
    sintering the shaped preform in an inert atmosphere to form a sintered reactive material, the sintered reactive material having a tensile strength greater than about 1800 psi and a strain greater than about 30% elongation at break.

19. The method of claim 18, wherein blending fuel particles and a polymer matrix comprises blending fuel particles having an average particle size of less than 500 microns with the polymer matrix.

20. The method of claim 18, wherein blending fuel particles and a polymer matrix comprises blending fuel particles comprising at least one reactive nonoxidized metal selected from the group consisting of aluminum, zirconium, titanium, and magnesium with the polymer matrix.

21. The method of claim 18, wherein blending fuel particles and a polymer matrix comprises providing the fuel particles to account for from approximately 15 weight percent to approximately 35 weight percent of a total weight of the sintered reactive material.

22. The method of claim 18, wherein blending fuel particles and a polymer matrix comprises blending aluminum particles and the polymer matrix.

23. The method of claim 18, wherein blending fuel particles and a polymer matrix comprising at least one fluoropolymer in a medium that consists essentially of an inert organic medium comprises blending the fuel particles and the polymer matrix in an environment that at least essentially excludes oxygen.

24. The method of claim 18, wherein drying the reactive material comprises drying the reactive material in an environment that at least essentially excludes oxygen.

25. The method of claim 18, wherein pressing the reactive material to obtain a shaped preform comprises pressing the reactive material in an environment that at least essentially excludes oxygen.

26. A reactive material, comprising:
a polymeric matrix comprising at least one fluoropolymer; and
energetic fuel particles dispersed in the polymemic matrix, the energetic fuel particles comprising at least one nonoxidized metal selected from the group consisting of aluminum, zirconium, titanium, and magnesium, wherein the energetic fuel particles and polymeric matrix are sintered.

27. The reactive material of claim 26, wherein the energetic fuel particles account for from approximately 15 weight percent to approximately 35 weight percent of a total weight of the reactive material.

28. The reactive material of claim 26, wherein the energetic fuel particles have an average particle size of less than about 500 microns.

29. The reactive material of claim 26, wherein an average particle size of the energetic fuel particles is not greater than about 250 microns.

30. The reactive material of claim 26, wherein an average particle size of the energetic fuel particles is in a range of from approximately 1 micron to approximately 10 microns.

31. The reactive material of claim 26, wherein the energetic fuel particles comprise aluminum.

32. The reactive material of claim 26, wherein the reactive material has a tensile strength greater than about 1800 psi and a strain greater than about 30% elongation at break.

33. A warhead, comprising:
a liner comprising a sintered reactive material, the sintered reactive material comprising a polymeric matrix comprising at least one fluoropolymer and energetic fuel particles dispersed in the polymeric matrix, the energetic fuel particles comprising at least one nonoxidized metal selected from the group consisting of aluminum, zirconium, titanium, and magnesium.

34. The warhead of claim 33, wherein the energetic fuel particles have an average particle size of less than about 500 microns.

35. The warhead of claim 33, wherein an average particle size of the energetic fuel particles is not greater than about 250 microns.

36. The warhead of claim 33, wherein an average particle size of the energetic fuel particles is in a range of from approximately 1 micron to approximately 10 microns.

37. The warhead of claim 33, wherein the energetic fuel particles comprise aluminum.

38. The warhead of claim 33, wherein the reactive material has a tensile strength greater than about 1800 psi and a strain greater than about 30% elongation at break.

39. The warhead of claim 33, wherein the liner is continuous.

40. The warhead of claim 33, wherein the liner is non-continuous.

41. The warhead of claim 33, wherein the energetic fuel particles account for from approximately 15 weight percent to approximately 35 weight percent of a total weight of the sintered reactive material.

* * * * *

UNITED STATES PATENT AND TRADEMARK OFFICE
CERTIFICATE OF CORRECTION

| | |
|---|---|
| PATENT NO. | : 7,307,117 B2 |
| APPLICATION NO. | : 10/462437 |
| DATED | : December 11, 2007 |
| INVENTOR(S) | : Daniel B. Nielson, Richard L. Tanner and Gary K. Lund |

It is certified that error appears in the above-identified patent and that said Letters Patent is hereby corrected as shown below:

On the title page:
In ITEM (75) Inventors:  change "Gary K. Lund, Malad, IN (US)" to --Gary K. Lund, Malad, ID (US)--

COLUMN 6, LINE 18, change "25° C./hour, be considered." to --25° C./hour, may be considered.--

COLUMN 7, LINE 23, change "course machining marks;" to --coarse machining marks;--

CLAIM 26, COLUMN 11, LINE 14, change "polymemic" to --polymeric--

Signed and Sealed this

Twenty-third Day of December, 2008

JON W. DUDAS
*Director of the United States Patent and Trademark Office*